(12) United States Patent
Lin

(10) Patent No.: US 9,674,319 B2
(45) Date of Patent: Jun. 6, 2017

(54) DETECTION METHOD IN NETWORK SYSTEM AND RELATED APPARATUS

(71) Applicant: Wistron Corporation, New Taipei (TW)

(72) Inventor: Yu-Ta Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 181 days.

(21) Appl. No.: 14/079,643

(22) Filed: Nov. 14, 2013

(65) Prior Publication Data

US 2014/0136695 A1 May 15, 2014

(30) Foreign Application Priority Data

Nov. 14, 2012 (TW) .............................. 101142438 A

(51) Int. Cl.
| | | |
|---|---|---|
| *G06F 15/173* | (2006.01) | |
| *H04L 29/14* | (2006.01) | |
| *H04L 29/12* | (2006.01) | |
| *H04L 12/24* | (2006.01) | |

(52) U.S. Cl.
CPC .......... *H04L 69/40* (2013.01); *H04L 61/2015* (2013.01); *H04L 41/0806* (2013.01); *H04L 41/0886* (2013.01)

(58) Field of Classification Search
CPC ............................ H04L 69/40; H04L 61/2015
USPC ................................................. 709/224, 203
See application file for complete search history.

(56) References Cited

U.S. PATENT DOCUMENTS

| | | | | |
|---|---|---|---|---|
| 6,457,879 B1 * | 10/2002 | Thurlow | ............. | G06Q 10/107 709/206 |
| 7,626,937 B2 | 12/2009 | Chen | | |
| 2004/0037308 A1 * | 2/2004 | Chen | ....................... | H04L 1/00 370/462 |
| 2007/0143454 A1 * | 6/2007 | Ma | ...................... | H04L 67/1008 709/222 |
| 2007/0174473 A1 * | 7/2007 | Zhao | ................... | H04L 29/1282 709/230 |
| 2008/0162702 A1 * | 7/2008 | Jia | ....................... | H04L 12/2856 709/227 |

(Continued)

FOREIGN PATENT DOCUMENTS

| | | |
|---|---|---|
| CN | 1921496 A | 2/2007 |
| CN | 101465756 A | 6/2009 |
| TW | I245507 | 12/2005 |

OTHER PUBLICATIONS

Office action mailed on Mar. 12, 2015 for the Taiwan application No. 101142438, filed Nov. 14, 2012, p. 1 line 12-14, p. 2-6 and p. 7 line 1-2.

(Continued)

*Primary Examiner* — Philip B Tran
(74) *Attorney, Agent, or Firm* — Winston Hsu

(57) ABSTRACT

A detection method, used in a network system, for detecting an online state of a server, includes a host generating a discover packet according to a media access control address of a network interface card of the server and transmitting the discover packet to the network system; and the host capturing the server internet protocol address in at least one offer packet when receiving the at least one offer packet corresponding to the discover packet, and storing the server internet protocol address in a detection result file.

17 Claims, 4 Drawing Sheets

(56) References Cited

U.S. PATENT DOCUMENTS

| | | | |
|---|---|---|---|
| 2010/0250357 A1* | 9/2010 | Kim | G06Q 30/02 705/14.23 |
| 2010/0254273 A1* | 10/2010 | Lin | H04L 12/2898 370/252 |
| 2011/0014984 A1* | 1/2011 | Penman | A63F 13/02 463/42 |
| 2011/0154440 A1* | 6/2011 | De Graaf | H04L 61/2015 726/3 |
| 2012/0158833 A1* | 6/2012 | Hopkins | G06F 17/30861 709/203 |
| 2012/0166518 A1* | 6/2012 | Alev | H04L 67/02 709/203 |
| 2012/0190339 A1* | 7/2012 | Abe | H04W 48/16 455/411 |
| 2013/0054550 A1* | 2/2013 | Bolohan | G06F 17/30902 707/705 |
| 2013/0091272 A1* | 4/2013 | Chien | H04L 61/2514 709/224 |
| 2013/0185421 A1* | 7/2013 | Yang | H04L 65/1066 709/224 |
| 2013/0198361 A1* | 8/2013 | Matsuzaki | H04L 41/50 709/223 |

OTHER PUBLICATIONS

Office action mailed/issued on Sep. 5, 2016 for CN application No. 201210526542.3, p. 3 line 4-40, p. 4 and p. 5 line 1.

\* cited by examiner

DETECTION METHOD IN NETWORK SYSTEM AND RELATED APPARATUS

BACKGROUND OF THE INVENTION

1. Field of the Invention

The present invention relates to a detection method and apparatus in a network system, and more particularly, to a detection method and apparatus which uses dynamic host configuration protocol messages to detect a corresponding online state of a server of a network system.

2. Description of the Prior Art

With the development of information and communication technology and the corresponding increase in network requirements of users, user devices have evolved from computing host devices to mobile communication devices and portable electronic devices. Modern network systems include more and more servers to manage the network for providing network services. Many software and hardware equipments, such as internet protocol (IP) routers, wireless access points, Internet Connection Sharing of Microsoft operating systems, and so on, can be regarded as servers, however. In such a situation, the private server may affect normal operations in a local area network.

For example, when a user rends an IP address from an office network but obtains the IP address from a private server due to automatic configuration, the user cannot normally access the office network. In this case, the network managers must spend more time solving the user's problem by using network packet analysis software. In a network system, a user can normally use network services or access resources of the network via the assigned server providing the network services.

Please refer to FIG. 1, which is a schematic diagram of a prior art server S11 establishing network connections. In FIG. 1, if the server S11 installs the cloud operating system via a host H, the server S11 should rend a server IP address ServIP_H from the host H. Therefore, the server S11 broadcasts a discover packet DPKT_S11 to the network system before rending the server IP address ServIP_H, and waits for the host H to respond with an offer packet OPKT_H. Server S12, which also exists in the network system, responds first with an offer packet OPKT_S12 to the server S11 after receiving the discover packet DPKT_S11, so that the server S11 mistakenly uses a server IP address ServIP_S12 in the offer packet OPKT_S12 provided by the server S12 to connect to the network system, and further uses a request packet RPKT_S12 and an acknowledgement packet APKT_S12 to establish connections with the server S12. Therefore, the host H cannot successfully establish connections with the server S11 and will fail to execute the installing operations of the cloud operating system.

How to prevent failure to normally execute following operations because of rending the IP address from the unassigned server has therefore become a goal in the industry.

SUMMARY OF THE INVENTION

The present invention therefore provides a detection method and network system for detecting an online state corresponding to a network system server which can detect other servers in the network system that are capable of offering internet protocol addresses, and further reduce the probability of a server rending an IP address from an unassigned server.

A detection method, used in a network system, for detecting an online state of a server, is disclosed. The detection method comprises: a host generating a discover packet according to a media access control address of a network interface card of the server and transmitting the discover packet to the network system; and the host capturing a server internet protocol address carried in at least one offer packet when receiving the at least one offer packet corresponding to the discover packet and storing the server internet protocol address in a detection result file.

A network system is also disclosed. The network system comprises: a plurality of servers, each of the plurality of servers comprising a network interface card; and a host, used for detecting an online state of a server of the plurality of servers. The host comprises: a processor; a storage device, coupled to the processor, for storing a program code utilized for instructing the processor to execute a detection method; wherein the detection method comprises: generating a discover packet according to a media access control address of a network interface card of the server and transmitting the discover packet to the network system; and capturing a server internet protocol address in at least one offer packet when receiving the at least one offer packet corresponding to the discover packet and storing the server internet protocol address in a detection result file.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
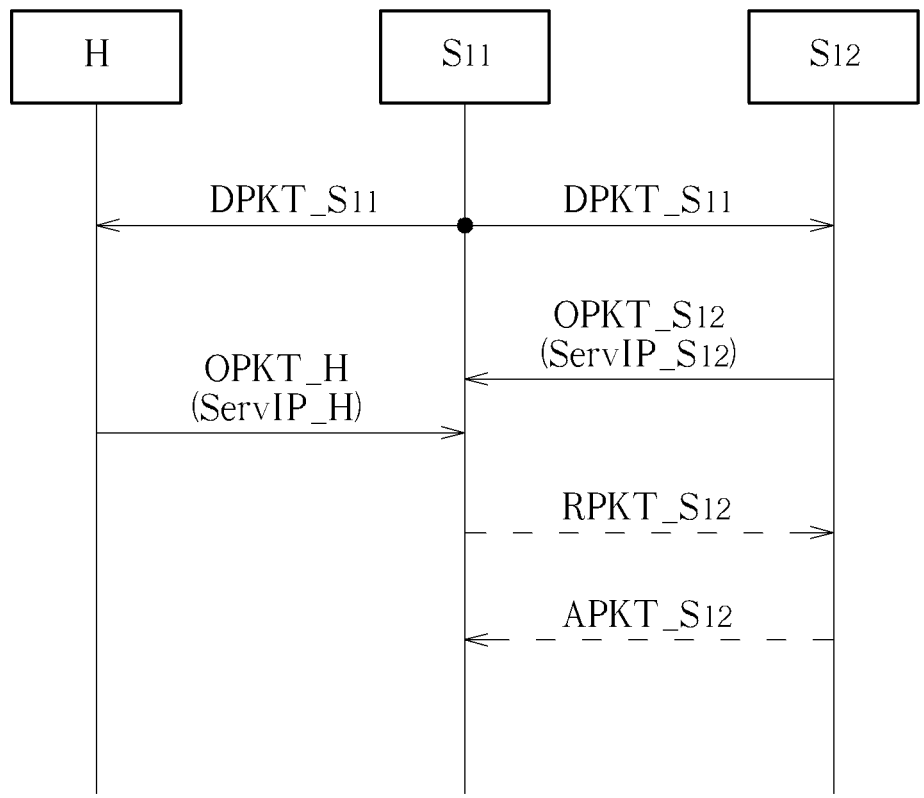
FIG. 1 is a schematic diagram of a server establishing network connections according to the prior art.
Figure 2:
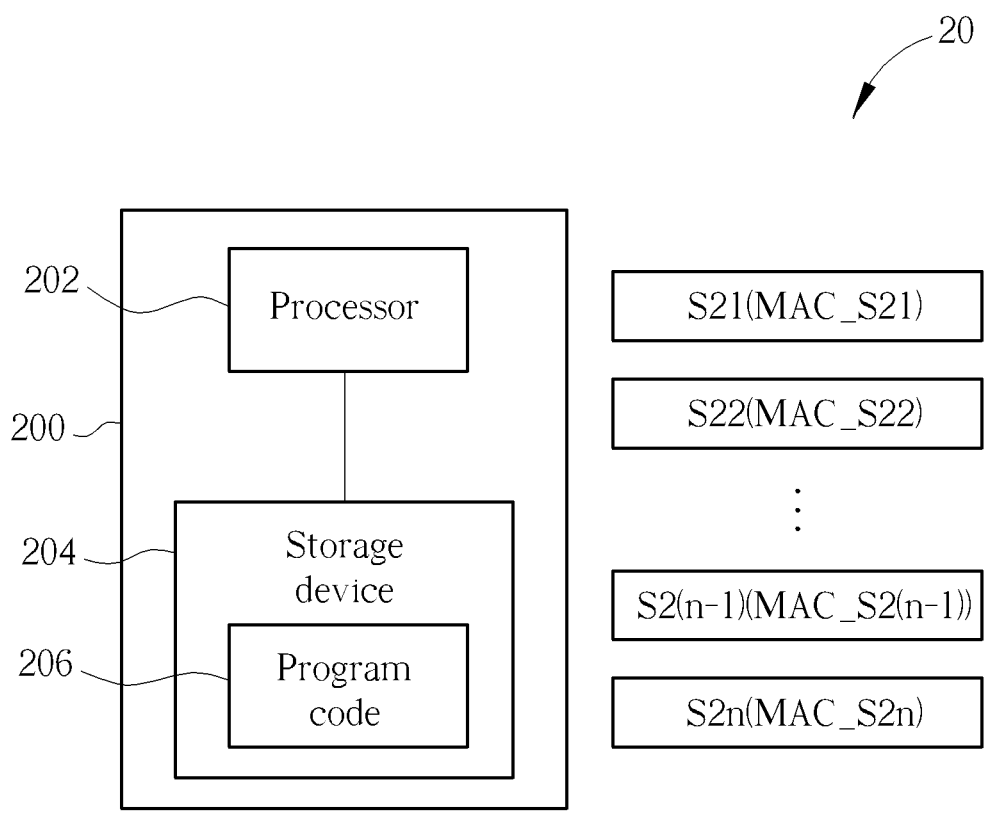
FIG. 2 is a schematic diagram of a network system according to an exemplary embodiment of the present invention.

Please refer to FIG. 2, which is a schematic diagram of a network system 20 according to an exemplary embodiment of the present invention. The network system 20 can be any information system which operates via a wired or wireless network transmission, such as a cloud network system, an office local area network and so on, but is not limited herein. The network system 20 is composed of servers S21~S2n and a host 200. An amount of servers S21~S2n is not limited to a specific value, i.e. n can be any positive integer larger or equal to 1, which is dependent on the system requirements. Moreover, the servers S21~S2n can be blade servers or micro servers, or the operations can be performed by normal user equipments instead of servers, such as mobile computers or personal computers. Each of the servers S21~S2n includes a network interface card, wherein the respective media access control (MAC) address is symbolized by MACS_S21~MAC_S2n. The host 200 can be an independent computer, a server or any device which executes network functions via dynamic host configuration protocol (DHCP). For simplicity, only a processor 202 and a storage device 204 included in the host 200 are symbolized in FIG. 2. The structure of the host 200 can be modified according to the system requirements by those skilled in the art, and is not limited herein. The processor 202 may be a microprocessor or Application Specific Integrated Circuit (ASIC). The storage device 204 is coupled to the processor 202 and may be any data storage device that can store a program code 206 to be accessed and executed by the processor 202. Examples of the storage device 204 include, but are not limited to, read-only memory (ROM), flash memory, random-access memory (RAM), CD-ROM/DVD-ROM, magnetic tape, hard disk and optical data storage device. The program code 206 instructs the processor 202 to execute a detection method, which is used for detecting corresponding online states of the servers S21~S2n and will be described in a process 30 according to an example of the present invention.

Figure 3:
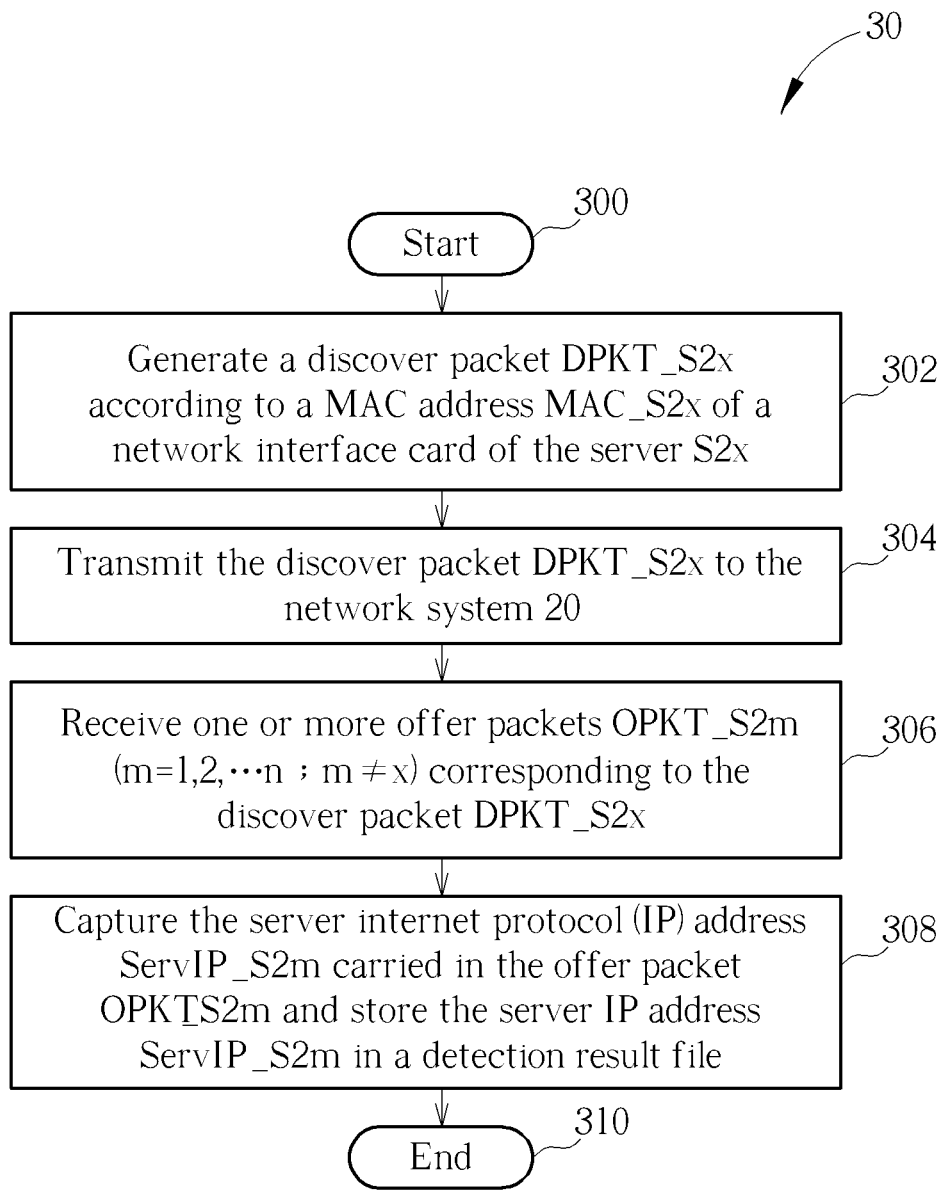
FIG. 3 is a flowchart according to an exemplary embodiment of the present invention.

Please refer to FIG. 3, which is a flowchart of the process 30 according to an exemplary embodiment of the present invention. The process 30 is utilized in the network system 20, for detecting a corresponding online state of a server S2x (x=1, 2, . . . n) from the servers S21~S2n. The process 30 includes the following steps:

Step 300: Start.

Step 302: Generate a discover packet DPKT_S2x according to a MAC address MAC_S2x of a network interface card of the server S2x.

Step 304: Transmit the discover packet DPKT_S2x to the network system 20.

Step 306: Receive one or more offer packets OPKT_S2m (m=1, 2, . . . n; m≠x) corresponding to the discover packet DPKT_S2x.

Step 308: Capture the server internet protocol (IP) address ServIP_S2m carried in the offer packet OPKT_S2m and store the server IP address ServIP_S2m in a detection result file.

Step 310: End.

According to the process 30, the present invention determines that one or more servers S2m exist in the network system 20 and are capable of providing the server IP address ServIP_S2m by transmitting the discover packet DPKT_S2x and receiving the offer packet OPKT_S2m, to thereby avoid the server S2x rending the server IP address from the unassigned server (i.e. the server IP address ServIP_S2m of the server S2m) and failing to normally execute the following operations (such as cloud operating system).

In detail, the host 200 generates the discover packet DPKT_S2x according to the MAC address MAC_S2x of the network interface card of the server S2x in Step 302 and transmits the discover packet DPKT_S2x to the network system 20 in Step 304. The host 200 receives the one or more offer packet OPKT_S2m corresponding to the discover packet DPKT_S2x in Step 306. The host 200 further captures the server IP address ServIP_S2m carried in the offer packet OPKT_S2m, stores the server IP address ServIP_S2m in the detection result file and finishes the process 30.

The present invention determines if another server S2m exists in the network system 20 and is capable of providing the server IP address ServIP_S2m via transmitting the discover packet DPKT_S2x and receiving the offer packet OPKT_S2m. Therefore, the user can know if other servers capable of providing IP addresses exist in advance before rending the server IP address, to avoid abnormal network services.

Please note that the process 30 is an example of the present invention, and those skilled in the art can readily make combinations, modifications and/or alterations to the abovementioned description and examples. For example, in Step 302, the MAC address MAC_S2x of the network interface card of the server S2x is obtained according to a configuration file which can relate to an installing process of a cloud operating system or any file as long as the file includes essential information of a server whose corresponding online state will be detected (i.e. a MAC address of a network interface card of a server). In Step 302, the discover packet DPKT_S2x can be generated by filling a random value into a field of a transaction identity of a traditional discover packet and filling the MAC address MAC_S2x of the server S2x into a field of a client MAC address of the traditional discover packet. As such, in Step 306, the one or more offer packet OPKT_S2m (m=1, 2, . . . n; m≠x) corresponding to the discover packet DPKT_S2x can be determined according to the transaction identities and the client MAC addresses in the discover packet DPKT_S2x and the offer packet OPKT_S2m. In other words, if the transaction identity and the client MAC address in the discover packet DPKT_S2x are respectively equal to the transaction identity and the client MAC address in the offer packet OPKT_S2m, the offer packet OPKT_S2m definitely corresponds to the discover packet DPKT_S2x. In addition, the detection result file can be used by the server S2x to determine if a corresponding packet is received so as to avoid abnormal operations when executing an installing process of an operating system. This is also an example of the present invention and those skilled in the art can readily make modifications to the abovementioned description and examples.

In order to avoid incorrect determination when no offer packet OPKT_S2m corresponds to the discover packet DPKT_S2x due to network jam or packet loss, the discover packet DPKT_S2x can be retransmitted to the network system 20 when the offer packet OPKT_S2m is not received in a time interval after the discover packet DPKT_S2x is transmitted. If the offer packet OPKT_S2m is still not received, the discover packet DPKT_S2x can be retransmitted again until the times of retransmission reaches an upper bound. For example, the upper bound can be set to 3 times and the time intervals can be set to 2, 4 and 8 seconds, but are not limited herein.

According to the process 30, the present invention determines one or more servers exist in the network system 20 and are capable of providing the server IP address via transmitting the discover packet and receiving the offer packet, to avoid rending the server IP address obtained from the unassigned server. When the corresponding offer packet is not received, a retransmission mechanism can be further started to avoid incorrect determination when there is no corresponding offer packet due to network jam or packet loss.

Figure 4:
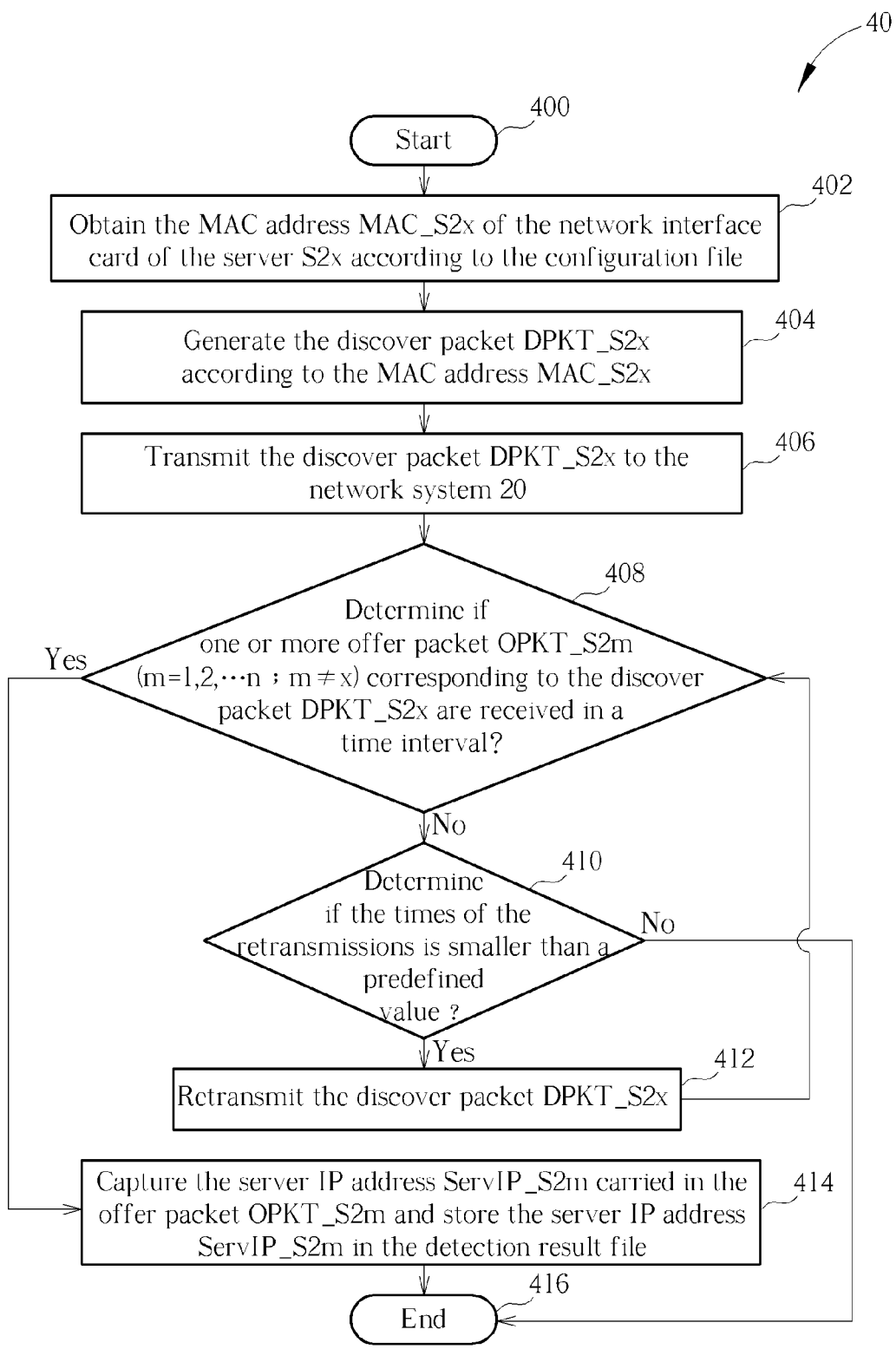
FIG. 4 is a flowchart according to an exemplary embodiment of the present invention.

The abovementioned process 30 and the modifications can be further summarized as a process 40, as shown in FIG. 4. The process 40 includes the following steps:

Step 400: Start.

Step 402: Obtain the MAC address MAC_S2x of the network interface card of the server S2x according to the configuration file.

Step 404: Generate the discover packet DPKT_S2x according to the MAC address MAC_S2x.

Step 406: Transmit the discover packet DPKT_S2x to the network system 20.

Step 408: Determine if one or more offer packet OPKT_S2m (m=1, 2, . . . n; m≠x) corresponding to the discover packet DPKT_S2x are received in a time interval. If yes, execute Step 414; if not, execute Step 410.

Step 410: Determine if the times of the retransmissions is smaller than a predefined value. If yes, execute Step 412; if not, execute Step 416.

Step 412: Retransmit the discover packet DPKT_S2$x$ and go back to Step 408.

Step 414: Capture the server IP address ServIP_S2$m$ carried in the offer packet OPKT_S2$m$ and store the server IP address ServIP_S2$m$ in the detection result file.

Step 416: End.

In the prior art, a user should normally access resources of a network system via an assigned server providing network services. As many private servers affect normal operations of a network system, this causes the network managers to spend more time solving the user's problem by using network packet analysis software. In comparison, the present invention provides a detection method for the users to know if other servers capable of providing IP addresses exist in advance before rending the server IP address, which prevents failure to use the network services. The present invention can be used for knowing if other servers capable of providing IP addresses exist in advance before executing an installing process of an operating system, to prevent failure to normally perform following operations.

To sum up, in order to avoid rending the server IP address from the unassigned server and thereby abnormally executing following operations, the present invention determines that other servers exist in the network system which are capable of providing the server IP address by transmitting DHCP messages, to decrease the probability of being assigned an IP address provided by an unassigned server.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detection method, used in a network system, for detecting whether an unassigned server exists in the network system, the detection method comprising:
   a host generating a discover packet of Dynamic Host Configuration Protocol (DHCP) according to a media access control address of a network interface card of a server and transmitting the discover packet to the network system;
   the host capturing a server internet protocol address in at least one offer packet when receiving the at least one offer packet of DHCP corresponding to the discover packet, wherein the server internet protocol address is provided by the unassigned server when the unassigned server exists in the network system and is preconfigured with the server internet protocol address; and
   the host storing the server internet protocol address in a detection result file;
   wherein whether the unassigned server exists in the network system is determined according to the server internet protocol address stored in the detection result file.

2. The detection method of claim 1, wherein the step of the host generating the discover packet of DHCP according to the media access control address of the network interface card of the server comprises:
   obtaining the media access control address according to a configuration file to generate the discover packet.

3. The detection method of claim 2, wherein the configuration file is utilized for an installing process of an operating system.

4. The detection method of claim 1, wherein the server determines if a corresponding offer packet is received by the server according to the detection result file.

5. The detection method of claim 1, further comprising:
   retransmitting the discover packet to the network system in at least one time interval when the offer packet is not received in a predefined interval after the discover packet is transmitted.

6. The detection method of claim 5, wherein the number of times the discover packet is retransmitted is smaller than a predefined value.

7. The detection method of claim 1, wherein both the discover packet and the offer packet comprise a transaction identity and a client media access control address.

8. The detection method of claim 7, wherein the transaction identity and the client media access control address of the discover packet respectively are the transaction identity and the client media access control address of the offer packet.

9. A network system, comprising:
   a plurality of servers, each of the plurality of servers comprising a network interface card; and
   a host, used for detecting an online state of a server of the plurality of servers, the host comprising:
      a processor;
      a storage device, coupled to the processor, for storing a program code utilized for instructing the processor to execute a detection method for detecting whether an unassigned server exists in the network system;
      wherein the detection method comprises:
         generating a discover packet of Dynamic Host Configuration Protocol (DHCP) according to a media access control address of a network interface card of the server and transmitting the discover packet to the network system;
         capturing a server internet protocol address in at least one offer packet when receiving the at least one offer packet of DHCP corresponding to the discover packet, wherein the server internet protocol address is provided by the unassigned server when the unassigned server exists in the network system and is preconfigured with the server internet protocol address; and
         storing the server internet protocol address in a detection result file;
         wherein whether the unassigned server exists in the network system is determined according to the server internet protocol address stored in the detection result file.

10. The network system of claim 9, wherein the step of generating the discover packet of DHCP according to the media access control address of the network interface card of the server comprises:
    obtaining the media access control address according to a configuration file to generate the discover packet.

11. The network system of claim 10, wherein the configuration file is utilized for an installing process of an operating system.

12. The network system of claim 9, wherein the server of the plurality of the servers determines if a corresponding offer packet is received by the server according to the detection result file.

13. The network system of claim 9, further comprising:
    retransmitting the discover packet to the network system in at least one time interval when the offer packet is not received in a predefined interval after the discover packet is transmitted.

14. The network system of claim 13, wherein the number of times the discover packet is retransmitted is smaller than a predefined value.

15. The network system of claim 9, wherein both the discover packet and the offer packet comprise a transaction identity and a client media access control address.

16. The network system of claim 15, wherein the transaction identity and the client media access control address of the discover packet respectively are the transaction identity and the client media access control address of the offer packet.

17. The network system of claim 9, wherein the host is a server or an independent computer.

* * * * *